No. 723,769. PATENTED MAR. 24, 1903.
P. WHITING.
CHECK VALVE AND BRAKE SYSTEM.
APPLICATION FILED OCT. 9, 1902.
NO MODEL. 4 SHEETS—SHEET 1.

Witnesses:
F. L. Ourand
Frank G. Radelfinger.

Inventor:
Paul Whiting.
by Laws Bagger & Co.,
Attorneys.

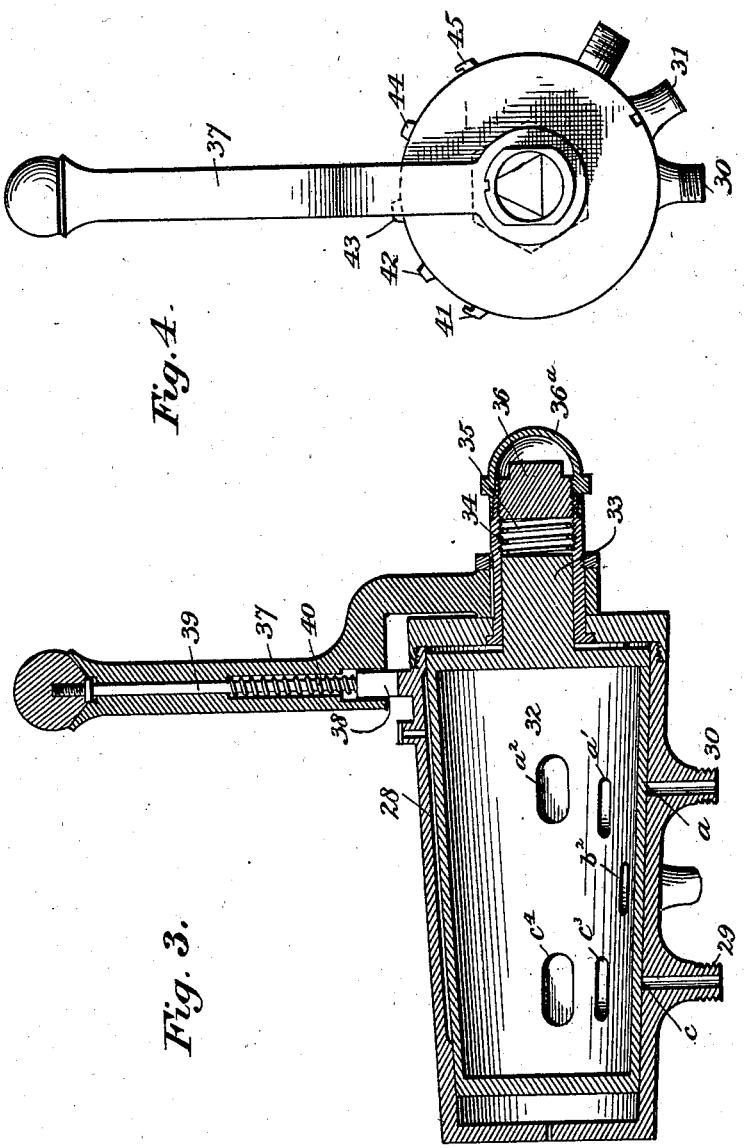

No. 723,769. PATENTED MAR. 24, 1903.
P. WHITING.
CHECK VALVE AND BRAKE SYSTEM.
APPLICATION FILED OCT. 9, 1902.
NO MODEL. 4 SHEETS—SHEET 3.

Witnesses:
F. L. Durand
Frank G. Radelfinger

Inventor:
Paul Whiting.
by Louis Bagger & Co.
Attorneys.

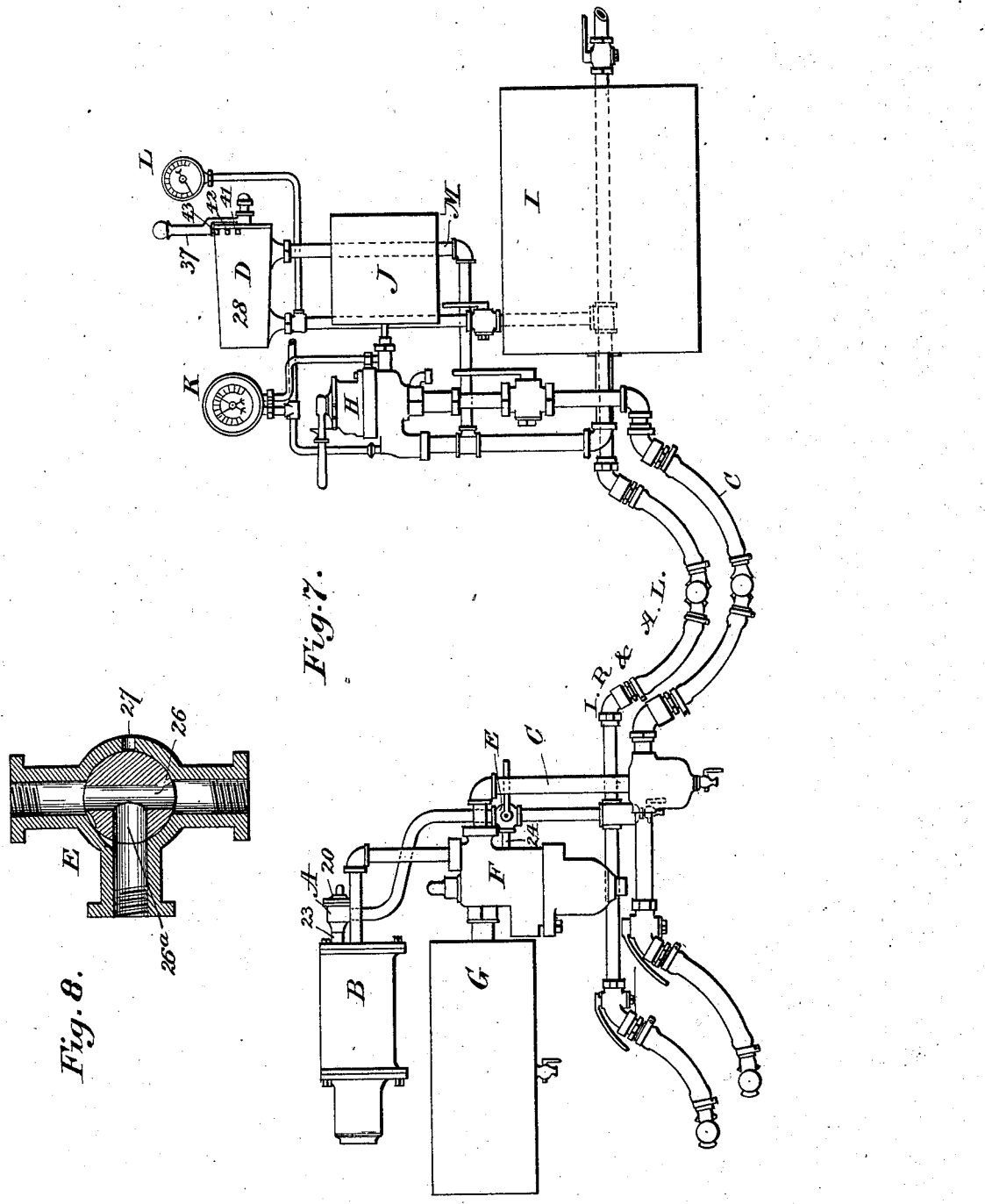

UNITED STATES PATENT OFFICE.

PAUL WHITING, OF EAST LAS VEGAS, TERRITORY OF NEW MEXICO.

CHECK-VALVE AND BRAKE SYSTEM.

SPECIFICATION forming part of Letters Patent No. 723,769, dated March 24, 1903.

Application filed October 9, 1902. Serial No. 126,485. (No model.)

*To all whom it may concern:*

Be it known that I, PAUL WHITING, a citizen of the United States, residing at East Las Vegas, in the county of San Miguel and Territory of New Mexico, have invented new and useful Improvements in Check-Valves and Brake Systems, of which the following is a specification.

My invention relates to a check-valve for combined automatic and straight air-brake systems, and has for its object to construct a valve for use in combination with the ordinary triple valve and an independent release and application line (I. R. and A. L.) which is used in combination with an automatic air-line.

The simple and novel construction employed by me in carrying out my invention is fully described and claimed in this specification, together with a complete air-brake system, and illustrated in the accompanying drawings, forming a part thereof, in which—

Figure 1:
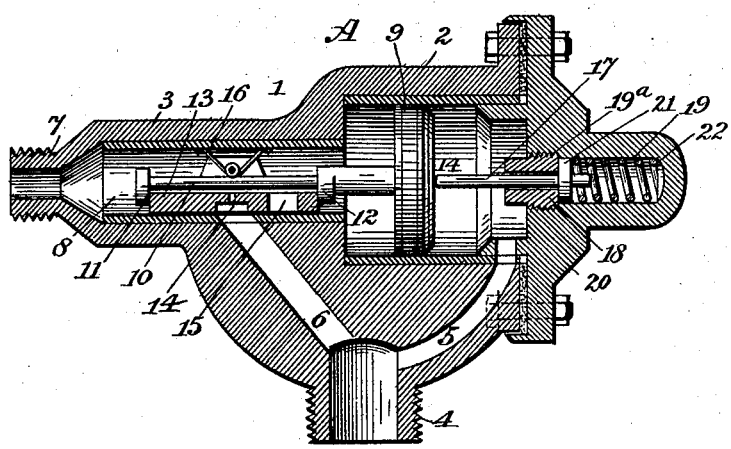
Figure 2:
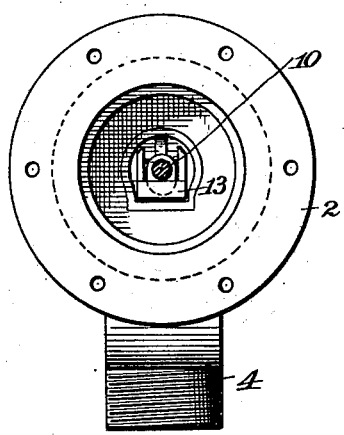
Figure 9:
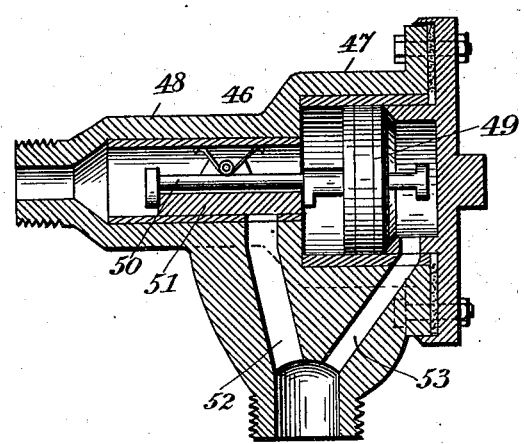
Figure 5:
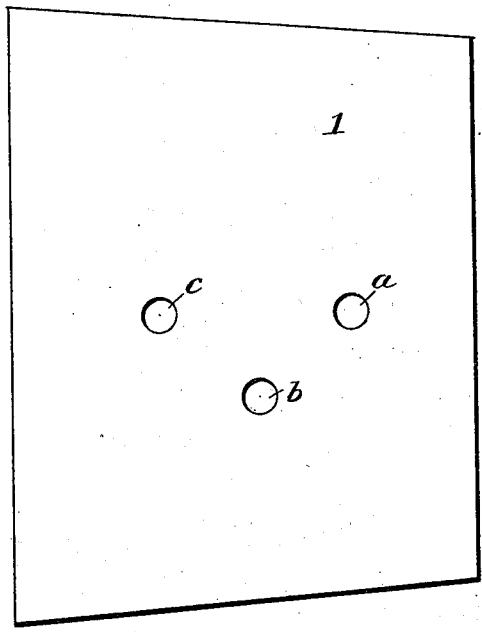
Figure 6:
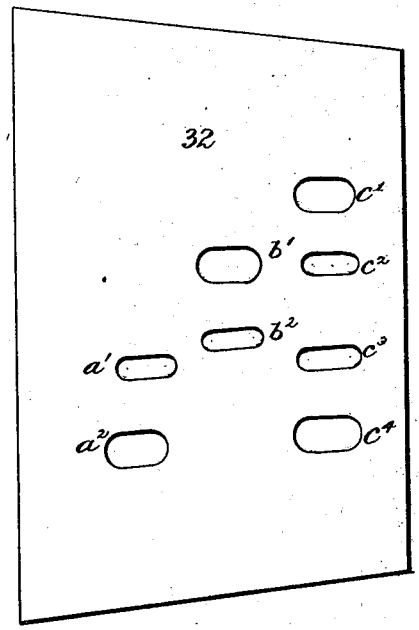

Figure 1 is a longitudinal section of my check-valve. Fig. 2 is an end view of same with the head removed. Fig. 3 is a longitudinal section of the cylinder-valve. Fig. 4 is an end elevation of the same. Fig. 5 is a development of the casing. Fig. 6 is a development of the valve. Fig. 7 is a diagrammatic plan view of my system. Fig. 8 is a detail of the cut-out cock. Fig. 9 is a detail of a modified form of check-valve.

Like characters of reference designate like parts in the different views of the drawings.

The numeral 1 designates the casing of my check-valve, comprising a cylinder 2, bearing a neck 3. A connection 4 is formed integral with the casing and communicates by passages 5 and 6, the inner ends of which form ports within the cylinder 2 and the neck 3, respectively. A connection 7 is formed on the neck 3 and communicates with the throat 8 thereof. A piston 9 is mounted in the cylinder 2, and a piston-rod 10 is connected thereto, which carries projections 11 and 12, which serve to engage the ends of a slide-valve 13, mounted within the throat 8 and having ports 14 and 15 therein. The port 14 is a leakage-port and is set to register with the port 6 when the piston is in its normal central position. The port 15 is located to be in register with the port 6 when the piston 9 is moved to the extreme left. The valve 13 covers the port 6 when the piston 9 is seated on the right. A spring 16 is carried by the piston-rod 10 and engages the casing to serve to hold the valve 13 in its seat.

Located in alinement with the piston-rod 10 is a stem 17, which passes through an apertured nut 18, seated in the threaded mouth 19$^a$ of a recess 19, formed in the detachable head 20 of the cylinder 2. A collar 21 is fitted on the stem 17 and engages one end of a coiled spring 22, mounted in the recess 19. The combination of the stem 17 and spring 22 form a buffer which normally holds the piston 9 in its central position, so the ports 6 and 14 register.

When in use, my check-valve, which I will designate A, forms part of an air-brake system which will be very briefly described, reference being made to Fig. 7.

A brake-cylinder B is connected by a pipe 23 to the connection 7 of the check-valve A, which valve is coupled by means of the connection 4 to what I call an "independent release and application line" (I. R. and A. L.) with which the train is equipped, in addition to a regular automatic air train-line C. The I. R. and A. L. extends from the valve A to a cylinder-valve D, to be hereinafter described. A cut-out cock E is mounted in the I. R. and A. L. at the junction of this line, and a pipe 24, which is to the exhaust of a triple valve F of ordinary construction. The cut-out cock E has a passage 26 therein, which is normally set in alinement with the I. R. and A. L., and a passage 26$^a$, set to connect with triple F. A port 27 is formed in the casing to enable the cock E to be set to permit the triple to exhaust into the atmosphere. The triple F is connected to the train-line C and to an auxiliary reservoir G in the usual manner. An engineer's valve H of standard form is connected to the line C, to a main reservoir I, and to a small reservoir J. Pressure-gages K and L are connected to the valve H and to the I. R. and A. L., respectively. A pipe M establishes connection between the line C and the I. R. and A. L. by way of the valve D, which will be next described, reference being had to Figs. 3 to 6, inclusive.

The numeral 28 designates the casing of my valve, which is slightly coned and supplied with two connections 29 and 30, which are coupled to the I. R. and A. L. and the pipe M, respectively, and communicate with ports $a$ and $c$ in the casing. An exhaust-nozzle 31 is also formed on the casing and connects with an exhaust-port $b$ therein. A hollow valve 32 fits within the casing and has three series of ports designed to register with the ports $a$ $b$ $c$. The ports which register with $c$ are four in number and are designated $c'$, $c^2$, $c^3$, and $c^4$. There are two ports $b'$ and $b^2$, arranged to be brought into register with the exhaust-port $b$, and two ports $a'$ and $a^2$, arranged to register with the port $a$. A spindle 33 is formed integral with the valve 32 and fits within a sleeve 34. A spring 35 is mounted within the sleeve 34 and bears at one end on the spindle 33 and at the other on a nut 36, fitting threads within the said sleeve. A cap-nut $36^a$ fits over the end of the sleeve 34. A handle 37 is keyed on the sleeve 34 and carries a latch 38, secured to a rod 39, mounted in an aperture in the handle and actuated by a spring 40. Lugs 41, 42, 43, 44, and 45 are formed on the casing 28 and are located to be engaged by the latch 38. The end lugs 41 and 45 have catches thereon, designed to engage the latch to limit its movement, while the lugs 42, 43, and 44 are beveled on both sides to enable the latch 38 to be forced to ride over them. When the latch 38 engages the lug 41, the valve is in the first position. The ports $c$ and $c'$, $b$ and $b'$ are then in register, thereby giving a rapid exhaust from I. R. and A. L. to atmosphere. When latch 38 is moved over to abut lug 42, the valve D is in the second position. The ports $c$ and $c^2$ and $b$ and $b^2$ are then in register, giving a slower exhaust from I. R. and A. L. to the atmosphere. When handle 37 is moved over, so latch 38 abuts the middle lug 43, the valve D is in the third or lap position and no ports register. When handle is moved over until latch 38 abuts lug 44, the valve D is in the fourth position. The ports $a$ and $a'$ and $c$ and $c^3$ are then in register, thereby permitting air to flow from the main reservoir I through the valve D and into I. R. and A. L. When the handle is moved over until latch 38 engages lug 45, the valve is in fifth position. The ports $a$ and $a^2$ and $c$ and $c^4$ then register, permitting air to flow more rapidly from the main reservoir I into I. R. and A. L. than in the fourth position.

The complete operation of my system with spring 22 adjusted so that its expansive force is greater than normal breaking pressure is as follows: To set brakes, the valve D is placed in third (lap) position, after which the brakes can be applied by the automatic system in the usual manner by use of valve H. When train-line C exhaust has ceased, the handle on the engineer's valve H is restored to release position, which releases the triple F and permits air from the exhaust thereof to pass into the I. R. and A. L., bringing the pressure therein up to brake-cylinder B pressure, since valve D is normally set at lap (third) position. While the valves stand as above set forth, the train-line $c$ and auxiliary G can be recharged from main reservoir I. If it is desired to release any part of brake-cylinder pressure, the valve D is set at second position and the I. R. and A. L. opened to the atmosphere, thereby permitting the brake-cylinder pressure to escape via the triple F. If a full and quick release is desired, the valve D is set at first position, thereby permitting the air in the brake-cylinder to flow out via the triple F and I. R. and A. L. In case the brakes have been set and all available auxiliary pressure used and the train still gains speed the valve D may be set in fourth position and air allowed to flow from main reservoir I through valve D into I. R. and A. L., thence into check-valve A via passage 5 and into the rear chamber of valve A, thereby coming in contact with the piston 9, driving it to the left and bringing the port 15 into register with the passage 6, thus permitting air to flow from I. R. and A. L. through passage 6 into brake-cylinder B, setting brakes with main-reservoir I pressure. If, however, an emergency application is required and the pressure in the auxiliary G is too low, the valve D may be set in fifth position, which will operate the check-valve A the same as before, but will permit a more rapid flow of air from the main reservoir I into the I. R. and A. L. than is given by the fourth position. When the pressure in the main reservoir has been reduced below a predetermined pressure, the air-pump on the locomotive will be automatically started by mechanism not shown, as will be readily understood by those skilled in the art, and the pressure restored. Should from any cause the triple fail to release brakes, the valve D is set at release position, when the brake-cylinder will exhaust via port 14, passage 6, and I. R. and A. L. By this last operation the brake-cylinders are kept from being overcharged by next application and flat wheels thereby avoided. If the train should break in two when an emergency application is made, the pressure in the brake-cylinder B would act on the front face of the piston 9 and drive it to the right, since the expansive force of the spring 22 is less than the emergency-brake-cylinder B pressure, thereby closing passage 6 and retaining brake-cylinder pressure. The triple F would act as usual to admit auxiliary pressure to brake-cylinder B.

From the above explanation it will be seen that the following results may be obtained with my automatic retainer system: first, train line and auxiliaries can be recharged while brakes are set; second, any part of brake-cylinder pressure can be released without releasing the whole; third, second emergency is obtained by equalizing brake-cylinder and main-reservoir pressure or any part thereof, which liberates pump and furnishes any amount of required pressure; fourth, can hold brakes set when stopped on grades and fully recharge, so if break-in-two occurs when starting train full pressure is supplied to brakes, preventing detached portion from running back; fifth, all cylinders may be released regardless of sticky or defective triples, and thereby prevent a large percentage of flat wheels; sixth, can release at slow speed without danger of breaking in two, and thereby save a great amount of time, making meeting-points, getting trains over the road, &c.; seventh, in releasing brakes the rear end releases first and head end last, thereby avoiding break-in-twos and the damage consequent to draw-bars and connections; eighth, it is a perfect equalizer of brake-cylinder pressure throughout entire train; ninth, brake-cylinder pressure is shown by gage on engine; tenth, no need of setting hand-brakes when descending grades; eleventh, no danger of run-aways for want of air; twelfth, every feature of the braking system is hereby brought under the direct control of the engineer.

A modified form of check-valve is shown in Fig. 9, which has a casing 46, comprising a cylinder 47, bearing a neck 48. A piston 49 is mounted in the cylinder 47 and is connected by a stem 50 to a slide-valve 51. Passages 52 and 53 connect with the front and rear compartments of the casing 46 and with a connection 54. The slide-valve 51 has no ports therein, but is located to uncover passage 52 when piston 49 is moved to left. This form of check-valve operates the same as the preferred form, with the exception that in case triples fail to release brakes this form can give no relief.

I do not wish to be limited as to details of construction, as these may be modified in many particulars without departing from the spirit of my invention.

Having described my invention, what I claim as new, and desire to secure by Letters Patent, is—

1. In a check-valve for air-brake systems, the combination of a casing, a piston slidingly mounted in said casing, said casing being provided with a first connection which communicates with the chamber in front of said piston and a second connection which communicates with said casing by two passages, the first connecting with the chamber in front of said piston and the second communicating with the chamber in the rear of said piston, a slide-valve mounted in said forward chamber and connected to said piston to control the flow of air through said first-mentioned passage but otherwise permit the unobstructed movement of air in said chamber, substantially as described.

2. In a check-valve of the class described, the combination of a casing comprising a cylinder and a neck provided with a connection, said cylinder having a connection thereon which communicates with two passages in said casing the first of said passages communicating with the interior of said neck and the second communicating with the interior of said cylinder, a piston mounted intermediate said passages, a yielding abutment mounted to limit the movement of said piston, and a slide-valve connected to said piston and having two ports therein, said valve being located to regulate the flow of air through said first passage but to permit the passage of air from said first-mentioned connection into said cylinder, substantially as described.

3. In an air-brake system, the combination of a brake-cylinder, an auxiliary reservoir, a triple valve connected to said brake-cylinder and said auxiliary reservoir, a train-line connected to said triple, a second train-line connected to the exhaust of said triple, a check-valve casing connected to said brake-cylinder and said second train-line, said check-valve having two passages therein which communicate with said second train-line, a piston mounted intermediate said passages, a slide-valve connected to said piston and located to control the passage of air through one of said passages, substantially as described.

4. In a check-valve of the class described, the combination of a brake-cylinder, an auxiliary reservoir, a triple valve connected to said auxiliary and to said brake-cylinder, a train-line connected to said triple, a second train-line connected to the exhaust of said triple, a check-valve comprising a casing connected to said brake-cylinder and said second train-line, said casing having two passages therein which communicate with said second train-line, a piston mounted intermediate said passages, a yielding buffer mounted in the rear of said piston, a slide-valve connected to said piston and set to normally cover one of said passages, substantially as described.

5. In a check-valve for air-brake systems, a casing having two connections, one of which communicates with the interior of said casing by two passages, a piston slidingly mounted intermediate said passages, a spring-buffer mounted in the rear of said piston, and a slide-valve having two ports therein located to control the passage of air through the passage opening on the front side of said piston, said valve being located to permit the unobstructed passage of air from the other of said connections to chamber in front of the cylinder, substantially as described.

In testimony whereof I have hereunto set my hand in presence of two subscribing witnesses.

PAUL WHITING.

Witnesses:
WILLIAM T. MARSHALL,
W. B. BUNKER.